US012170050B2

(12) United States Patent
Chien

(10) Patent No.: US 12,170,050 B2
(45) Date of Patent: Dec. 17, 2024

(54) MOVING OBJECT DETECTING APPARATUS AND METHOD

(71) Applicant: DELTA ELECTRONICS, INC., Taoyuan (TW)

(72) Inventor: Chun-Chin Chien, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 37 days.

(21) Appl. No.: 18/321,709

(22) Filed: May 22, 2023

(65) Prior Publication Data

US 2024/0274057 A1 Aug. 15, 2024

(30) Foreign Application Priority Data

Feb. 15, 2023 (CN) ........................ 202310115551.1

(51) Int. Cl.
*G09G 5/10* (2006.01)
*G09G 3/20* (2006.01)
*G09G 3/36* (2006.01)

(52) U.S. Cl.
CPC ......... *G09G 3/2092* (2013.01); *G09G 3/3607* (2013.01); *G09G 2300/0452* (2013.01); *G09G 2320/103* (2013.01); *G09G 2370/22* (2013.01)

(58) Field of Classification Search
CPC ............... G09G 3/2092; G09G 3/3607; G09G 2300/0452; G09G 2320/103; G09G 2370/22
USPC ......................................... 345/690, 156, 691
See application file for complete search history.

(56) References Cited

U.S. PATENT DOCUMENTS

| | | | | |
|---|---|---|---|---|
| 11,062,161 | B1 * | 7/2021 | Park | G01J 3/0227 |
| 2015/0070337 | A1 | 3/2015 | Bell et al. | |
| 2018/0226055 | A1 | 8/2018 | Raymann et al. | |
| 2019/0139478 | A1 | 5/2019 | Jang | |
| 2019/0158809 | A1 * | 5/2019 | Sasaki | H04N 13/221 |
| 2020/0053348 | A1 * | 2/2020 | Oyagi | G06F 1/1692 |
| 2020/0111195 | A1 * | 4/2020 | Vlachos | G06F 3/013 |
| 2020/0234412 | A1 * | 7/2020 | Ise | H04N 23/73 |
| 2020/0410227 | A1 * | 12/2020 | Shaburov | G06T 7/90 |
| 2021/0183019 | A1 * | 6/2021 | Uchida | G06N 3/045 |
| 2024/0176912 | A1 * | 5/2024 | Yen | G06F 21/64 |

FOREIGN PATENT DOCUMENTS

| | | | |
|---|---|---|---|
| CN | 102300033 | A | 12/2011 |
| CN | 110928464 | A | 3/2020 |
| CN | 113126945 | A | 7/2021 |

(Continued)

*Primary Examiner* — Thuy N Pardo
(74) *Attorney, Agent, or Firm* — CKC & Partners Co., LLC

(57) ABSTRACT

A moving object detecting apparatus includes a display panel and a processor. The display panel is configured to display a plurality of pixels. The processor is configured to detect the pixels of a detected area to generate a first color value and a second color value corresponding to the detected area, and the first color value corresponds to a first time point and the second color value corresponds to a second time point. The processor is further configured to compare the first color value with the second color value to generate a color boundary variation value corresponding to the detected area. The processor is further configured to determine whether a moving object appears in the detected area based on the color boundary variation value.

20 Claims, 3 Drawing Sheets

20

(56) References Cited

FOREIGN PATENT DOCUMENTS

| | | | |
|---|---|---|---|
| TW | 201327416 | A | 7/2013 |
| TW | 202001796 | A | 1/2020 |
| TW | 202025119 | A | 7/2020 |
| TW | 732407 | B | 7/2021 |

* cited by examiner

MOVING OBJECT DETECTING APPARATUS AND METHOD

CROSS-REFERENCE TO RELATED APPLICATION

This application claims priority to China Application Serial Number 202310115551.1, filed Feb. 15, 2023, which is herein incorporated by reference in its entirety.

BACKGROUND

Field of Invention

The present disclosure relates to a moving object detecting apparatus and method. More particularly, the present disclosure relates to a moving object detecting apparatus and method.

Description of Related Art

With the rapid development of technology, existing display panels (e.g., display screens, projectors) contain many functions and applications. One of the functions is to detect whether a moving object appears in the display. For example, when a surveillance picture is presented by the display panel, the user can be notified that there are moving objects in the display; or when the display panel has been idle for a long time (i.e., there is no moving object for a long time), anti-burn-in process for the display panel is performed.

In order to detect the moving object in the display, the prior art compares the pixels of each position in the picture frame to be detected with the pixels of each position in the previous picture frame, if there is a difference between the current picture frame and the previous picture frame, it is determined that the display contains a moving object.

However, to compare the pixels of each position in the picture frame by frame, it is necessary to pre-store a large number of picture frames and all the pixels contained therein, which consumes a large amount of memory and computing resources, especially in 4K resolution, even after the introduction of display panels with 8K resolution, the requirements for computing resources for the prior art have increased significantly.

In view of this, how to provide a moving object detecting technology that can reduce the performance burden is the goal that the industry strives to work on.

SUMMARY

The disclosure provides a moving object detecting apparatus comprising a display panel and a processor. The display panel is configured to display a plurality of pixels. The processor is electrically connected to the display panel. The processor is configured to detect the pixels corresponding to a detected area to generate a first color value and a second color value corresponding to the detected area, wherein the first color value corresponds to a first time point, and the second color value corresponds to a second time point. The processor is further configured to compare the first color value with the second color value to generate a color boundary variation value corresponding to the detected area. The processor is further configured to determine whether a moving object appears in the detected area based on the color boundary variation value.

The disclosure also provides a moving object detecting method being adapted for use in a moving object detecting apparatus. The moving object detecting method comprises the following steps: detecting, from a plurality of pixels of a display panel, the pixels corresponding to a detected area to generate a first color value and a second color value corresponding to the detected area, wherein the first color value corresponds to a first time point, and the second color value corresponds to a second time point; comparing the first color value with the second color value to generate a color boundary variation value corresponding to the detected area; and determining whether a moving object appears in the detected area based on the color boundary variation value.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
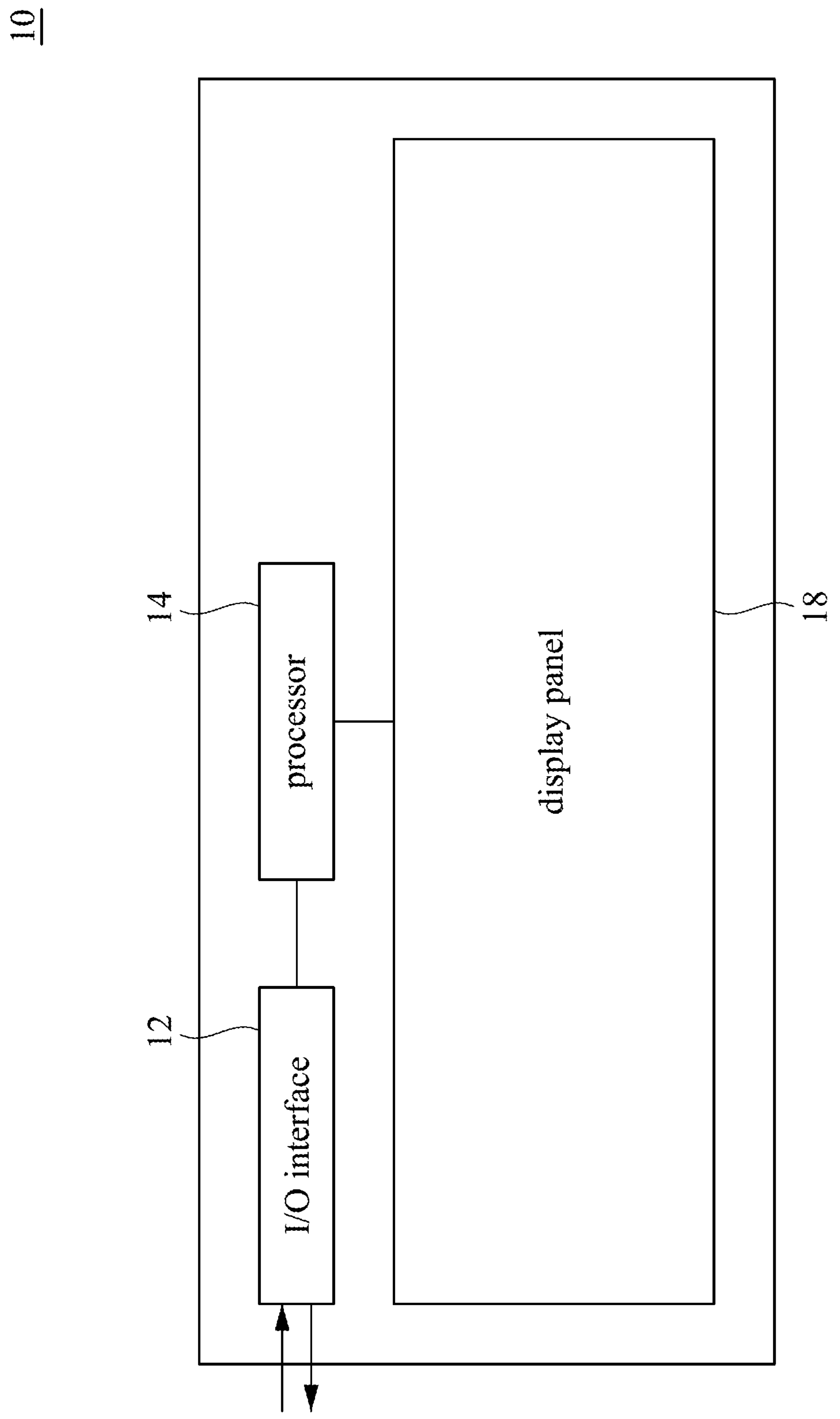
FIG. 1 is a schematic diagram illustrating a moving object detecting apparatus according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1. FIG. 1 is a schematic diagram illustrating a moving object detecting apparatus 10 according to some embodiments of the present disclosure. The moving object detecting apparatus 10 is configured to detect whether a moving object appears in the display and perform corresponding function according to the detection result. The moving object detecting apparatus 10 comprises an I/O interface 12, a processor 14, and a display panel 18. In some embodiments, the moving object detecting apparatus 10 further comprises an alarm.

In an embodiment, the moving object detecting apparatus 10 can set a detected area of the display panel 18 and perform calculation according to the display in the detected area (i.e., the pixels in the detected area) to detect whether a moving object appears in the detected area. In some embodiments, the detected area of the display panel 18 can be set by the user via the I/O interface 12.

The I/O interface 12 is configured to receive signals from external devices and transmit signals to external devices and the processor 14. For example, the I/O interface 12 receives a display signal from external computer and transmits the display signal to the processor 14, and the display signal is configured to provide display for the moving object detecting apparatus 10.

In some embodiments, the I/O interface 12 can comprise a High Definition Multimedia Interface (HDMI), a Display- Port interface, a Video Graphics Array (VGA) connector, a Digital Visual Interface (DVI), and/or other communication interfaces.

The processor 14 is configured to receive display signals and/or control signals from the I/O interface 12, performs calculations, and transmits signals to the I/O interface 12, the display panel 18, and the alarm according to the result of the calculations. In some embodiments, the moving object detecting apparatus 10 is a projector.

In some embodiments, the processor 14 can comprise a chip with a color level detection function and a level detect window function.

It shall be appreciated that since the chip with the color level detection function and the level detect window function is configured with a specific circuit corresponding to a display panel, the chip can quickly detect the level of the color (e.g., RGB color space) in the target range (e.g., the highest color value and the lowest color value in the target range) by using the specific circuit, and the target range can be set by using setting the level detect window.

In some embodiments, the moving object detecting apparatus 10 is a apparatus with surveillance and display function and can notify the user when suspicious objects appear in the surveillance display. Specifically, after the processor 14 of the moving object detecting apparatus 10 receives a display signal from the I/O interface 12, the processor 14 executes a moving object detecting method. If a moving object appears in the display, the moving object detecting apparatus 10 transmits a warning signal to the I/O interface 12 and the alarm to notify the user, and the corresponding device (e.g., computer) stores the image containing the moving object, sends messages, makes sound, and/or enables other function for notifying the user or storing the display. Furthermore, the processor 14 transmits a display signal and/or a warning signal to the display panel 18 to provide displays and/or notifications.

In some embodiments, the moving object detecting apparatus 10 is a projector. After the processor 14 of the moving object detecting apparatus 10 receives a display signal from the I/O interface 12, the processor 14 executes the moving object detecting method. If there is no moving object being detected in the display for a period of time, the processor 14 activates a screen saver function and transmits an on-screen display signal to the display panel 18. Accordingly, the display panel 18 displays color blocks different from the original display to prevent the display panel 18 from burning in. Additionally, the display panel 18 can also reduce brightness and/or stop displaying to prevent the display panel 18 from burning in and/or save energy. On the other hand, when the processor 14 of the moving object detecting apparatus 10 detects a moving object in the display, the moving object detecting apparatus 10 disables the screen saver function and displays the image received.

In some embodiments, after the processor 14 of the moving object detecting apparatus 10 receives a display signal from the I/O interface 12, the processor 14 executes the moving object detecting method. If there is no moving object being detected in the display for a period of time, the processor 14 activates sleeping function and transmits a control signal to the display panel 18. Accordingly, the display panel 18 reduces brightness and/or stop displaying to save energy.

In some embodiments, the processor 14 receives a control signal from the I/O interface 12, wherein the control signal comprises a detected area. Accordingly, the processor 14 executes the moving object detecting method for the pixels in the detected area to determine whether a moving object appears in the detected area.

The alarm is configured to notify the user that a moving object appears in the display. In some embodiments, the alarm is a light-emitting diode (LED). If the processor 14 detects a moving object appearing in the display, the processor 14 starts to transmit the warning signal to the alarm, and the alarm starts to flash. Next, if there is no moving object being detected in the display by the processor 14 for a period of time, the processor 14 stops transmitting the warning signal to the alarm, and the alarm stops flashing accordingly.

The display panel 18 is configured to receive the display signal from the processor 14 and display pixels according to the display signal. In some embodiments, the moving object detecting apparatus 10 is a screen apparatus, and the display panel 18 comprises a screen. In some embodiments, the moving object detecting apparatus 10 is a projector, and the display panel 18 comprises a digital micromirror device (DMD).

Figure 2:
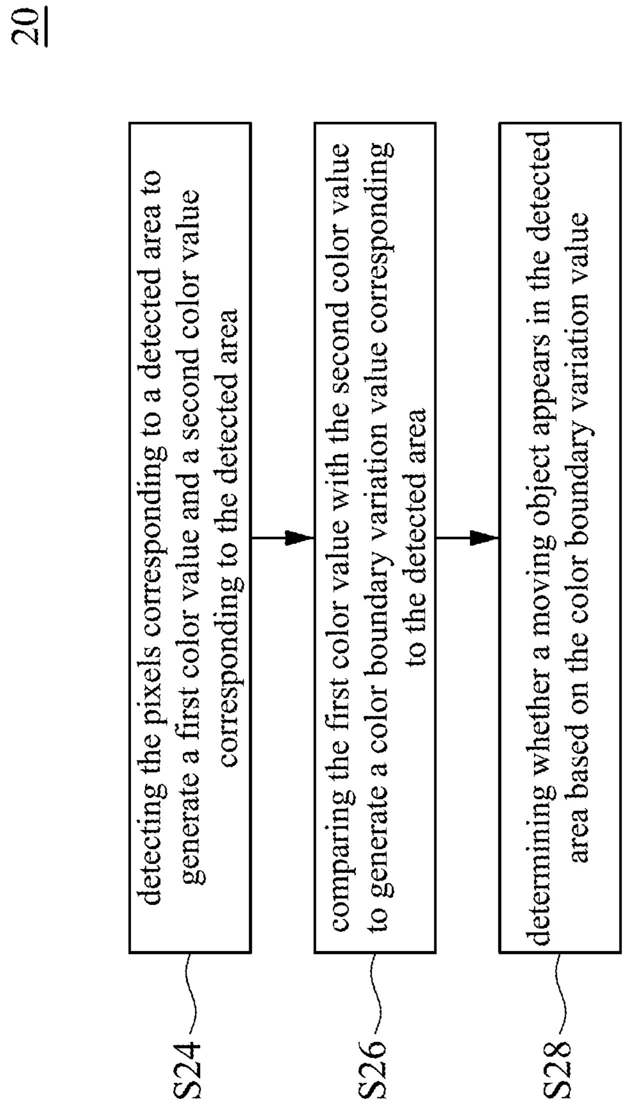
FIG. 2 is a flow diagram illustrating a moving object detecting method according to some embodiments of the present disclosure.

Reference is made to FIG. 2. FIG. 2 is a flow diagram illustrating a moving object detecting method 20 according to some embodiments of the present disclosure. The moving object detecting method 20 can be executed by the moving object detecting apparatus 10 shown in FIG. 1, and the moving object detecting method 20 comprises steps S24, S26, and S28. The moving object detecting method 20 is configured to determine whether a moving object appears in the detected area of the moving object detecting apparatus 10.

Figure 3:
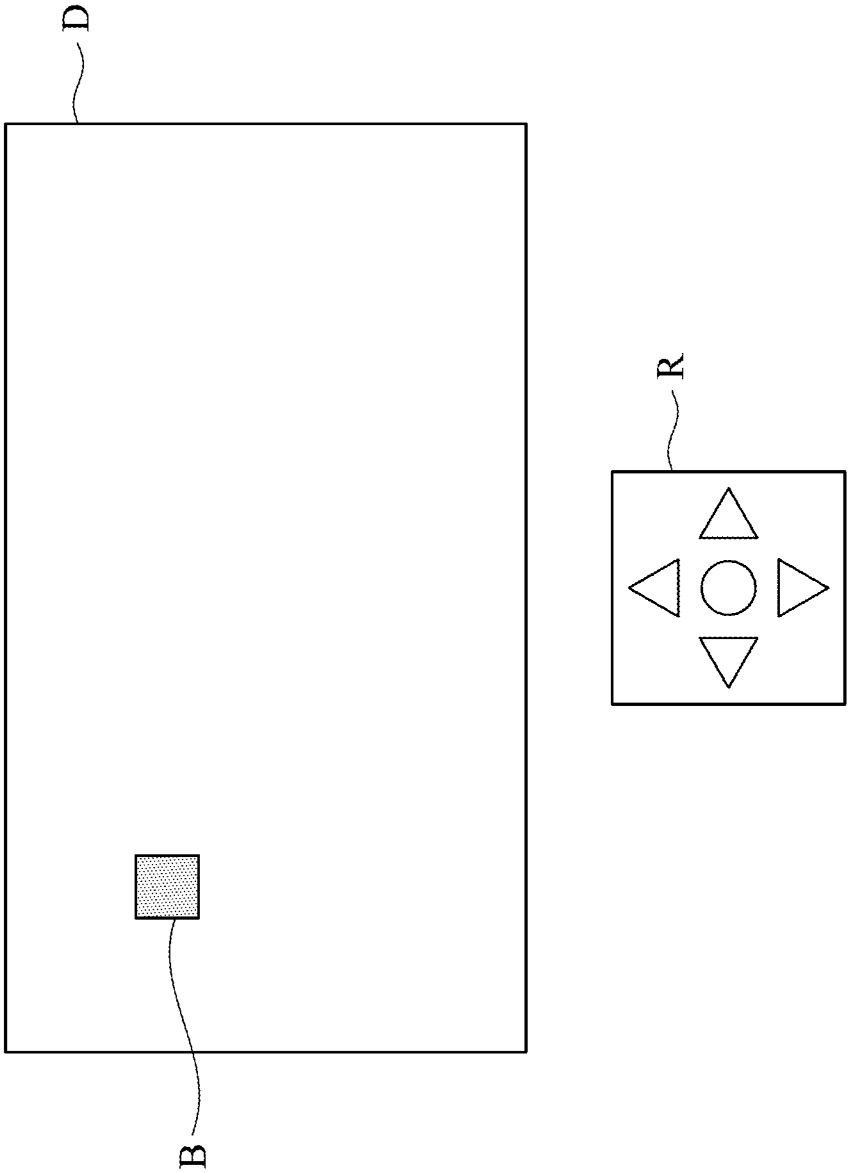
FIG. 3 is a schematic diagram illustrating determining a detection area according to some embodiments of the present disclosure.

In some embodiments, the moving object detecting apparatus 10 determines the detected area first. In some embodiments, the user can set the detected area. For example, please refer to FIG. 3. FIG. 3 is a schematic diagram illustrating determining a detection area according to some embodiments of the present disclosure. The moving object detecting apparatus 10 provides a display D, the display D comprises a block B. On the other hand, the user can control the block B to move the block B in the display D by operating a controller R, and confirm the detected area after moving the block B to the area where the user wants to detect. In some embodiments, the block B is displayed with an on-screen display in the display D, namely the area not covered by the block B in the display D displays the original image. Therefore, the user can ensure the location of the detected area corresponding to the location in the original image, e.g., a specific area in a surveillance display. In other embodiments, the function of the controller R can be implemented by other input apparatus. In other embodiments, the user can adjust the size of the block B by using the controller R or other input apparatus.

After the location of the block B is confirmed by the user, the processor 14 receives a detection signal, wherein the detection signal is the location of the block B. In some embodiments, the location of the block B is represented by 4 borders in the display D. Assumed that the display D comprises 1920×1200 pixels, the horizontal coordinate range of the display D from left to right is between 0-1919, and the vertical coordinate range of the display D from top to bottom is between 0-1199. For example, the block B can be represented by an area enclosed with a left border coordinate 1515, a right border coordinate 1715, a top border coordinate 200, and a bottom border coordinate 400.

In some embodiments, the moving object detecting apparatus 10 comprises a video control chip, thus, the processor 14 can set the detected area through the level detect window function configured in the video control chip. For example, the block B is set with a left border coordinate 1515, a right border coordinate 1715, a top border coordinate 200, and a bottom border coordinate 400.

Next, the moving object detecting apparatus 10 executes the step S24, detecting the pixels corresponding to the detected area (i.e., detecting the pixels corresponding to the detected area in the display panel 18) to generate a first color value and a second color value. In some embodiments, the processor 14 receives a display signal IS1 (not shown in figures) at a first time point and obtains the first color value corresponding to the detected area in the display signal IS1. Next, the processor 14 receives a display signal IS2 (not shown in figures) at a second time point and obtains the second color value corresponding to the detected area in the display signal IS2.

In some embodiments, the moving object detecting apparatus 10 can set a detection time interval (e.g., 1000 millisecond) and determine the first time point and the second time point dynamically with the restriction of the interval between the first time point and the second time point not exceeding the detection time interval.

The moving object detecting method 20 further comprises receiving the display signal IS2 at the second time point within the detection time interval after the first time point to obtain the second color value. Specifically, the processor 14 determines the second time point based on the first time point and the detection time interval, wherein a time interval corresponding to the first time point and the second time point is not greater than the detection time interval. For example, assumed that the detection time interval is set as 1 second, then after the display signal IS1 is received at the first time point, the processor 14 will receive the display signal IS2 in 1 second and generate the first color value and the second color value corresponding to the detected area according to the display signals IS1 and IS2.

In some embodiments, the first color value comprises a first highest color value and a first lowest color value corresponding to the detected area, and the second color value comprises a second highest color value and a second lowest color value corresponding to the detected area. Taking the RGB color space as an example, the first color value and the second color value comprise the highest value (i.e., the first highest color value and the second highest color value) and the lowest value (i.e., the first lowest color value and the second lowest color value) of the RGB color values in the detected area. Namely, the display signals IS1 and IS2 comprise RGB color values corresponding to the pixels of the display panel 18. Furthermore, the processor 14 obtains the RGB color values corresponding to the pixels of the detected area and calculates the highest value and the lowest value of red, green, and blue color values as the first color value and the second color value.

Furthermore, due to the display signals correspond to a RGB color space, the first highest color value comprises a first red highest color value, a first green highest color value, and a first blue highest color value, the second highest color value comprises a second red highest color value, a second green highest color value, and a second blue highest color value, the first lowest color value comprises a first red lowest color value, a first green lowest color value, and a first blue lowest color value, and the second lowest color value comprises a second red lowest color value, a second green lowest color value, and a second blue lowest color value.

For example, in the RGB color values corresponding to the pixels of the detected area in the display signal IS1, the highest value of the red color values is 200 (i.e., the first highest red color value), and the lowest value of the red color values is 50 (i.e., the first lowest red color value); the highest value of the green color values is 80 (i.e., the first highest green color value), and the lowest value of the green color values is 0 (i.e., the first lowest green color value); and the highest value of the blue color values is 150 (i.e., the first highest blue color value), and the lowest value of the blue color values is 76 (i.e., the first lowest blue color value). Thus, the first color value comprises values of (200, 50, 80, 0, 150, 76).

Similarly, the processor 14 calculates the RGB color values corresponding to the pixels of the detected area in the display signal IS2 and obtains the second color value in the same way. For example, the second color value comprises values of (188, 30, 78, 0, 130, 34), namely, the second highest red color value is 188, the second lowest red color value is 30, the second highest green color value is 78, the second lowest green color value is 0, the second highest blue color value is 130, and the second lowest blue color value is 34.

In some embodiments, the moving object detecting apparatus 10 comprises a video control chip, thus, the processor 14 can read the RGB color values corresponding to the pixels of the detected area set by the level detect window function through the color level detection function configured in the video control chip.

Next, the moving object detecting apparatus 10 executes the step S26, comparing the first color value with the second color value to generate a color boundary variation value corresponding to the detected area. The color boundary variation value is configured to indicate the degree of color change between the first color value and the second color value.

To calculate the color boundary variation value, the processor 14 compares the first highest color value with the second highest color value to calculate a high boundary difference value, compares the first lowest color value with the second lowest color value to calculate a low boundary difference value, and calculates the color boundary variation value based on the high boundary difference value and the low boundary difference value.

Taking the first color value and the second color value mentioned above as an example, the processor 14 subtracts the first highest color value and the first lowest color value of the first color value from the second highest color value and the second lowest color value of the second color value, wherein the first color value is obtained earlier than the second color value, and the calculation result is (−12, −20, −2, 0, −20, −42). Namely, the highest value of the red color value is reduced by 12, the lowest value of the red color value is reduced by 20, the highest value of the green color value is reduced by 2, the lowest value of the green color value is reduced by 0, the highest value of the blue color value is reduced by 20, and the lowest value of the blue color value is reduced by 42.

Furthermore, the processor 14 sums the absolute value of the difference between the second highest color values and the first highest color values (i.e., −12, −2, and −20) to obtain the high boundary difference value, 34. Similarly, the processor 14 sums the absolute value of the difference between the second lowest color values and the first lowest color values (i.e., −20, 0, and −42) to obtain the low boundary difference value, 62.

Furthermore, the processor 14 sums the absolute value of the high boundary difference value (i.e., 34) and the low boundary difference value (i.e., 62) to obtain the color boundary variation value. In this embodiment, the color boundary variation value is 96. It is noted that, the color boundary variation value can be calculated through other calculation methods according to the first color value and the second color value and is not limited to the embodiments provided in the present disclosure.

In some embodiments, the highest difference between the second highest color values and the first highest color values corresponding to one of the color values (e.g., red color value) can be taken as the color boundary variation value, or the highest difference between the second lowest color values and the first lowest color values corresponding to one of the color values (e.g., blue color value) can be taken as the color boundary variation value.

Finally, the moving object detecting apparatus 10 executes the step S28, determining whether a moving object appears in the detected area based on the color boundary variation value. In some embodiments, the moving object detecting method 20 comprises a threshold configured to determine whether the color boundary variation value indicates a moving object appearing in the detected area. For example, if the threshold is set as 80, the processor 14 determines whether the color boundary variation value is greater than the threshold (i.e., 80). If the color boundary variation value is greater than the threshold, the processor 14 determines a moving object appearing in the detected area. On the contrary, if the color boundary variation value is not greater than the threshold, the processor 14 determines no moving object appearing in the detected area. For the aforementioned embodiments, the color boundary variation value is 96, greater than the threshold (i.e., 80). Therefore, the processor 14 determines a moving object appearing in the detected area.

In some embodiments, the moving object detecting method 20 comprises a threshold, configured to determine whether the high boundary difference value and/or the low boundary difference value indicate a moving object appearing in the detected area. For example, if the threshold is set as 40, the processor 14 determines whether the color boundary variation value is greater than the threshold. If one of the high boundary difference value or the low boundary difference value is greater than the threshold, a moving object is determined appearing in the detected area. On the contrary, if the high boundary difference value and the low boundary difference value are not greater than the threshold, then the moving object is determined not to appear in the detected area. For the aforementioned embodiments, the high boundary difference value is 34, not greater than the threshold (i.e., 40). However, the low boundary difference value is 62, greater than the threshold (i.e., 40). Therefore, the processor 14 determines a moving object appears in the detected area.

In some embodiments, the moving object detecting method 20 calculates the threshold according to the time interval between obtaining the first color value and obtaining the first color value, namely, the time interval between the first time point and the second time point. For example, the greater the time interval between the first time point and the second time point, the greater the threshold. Therefore, the moving object detecting method 20 can take the factor of time, and the greater the time interval between the first time point and the second time point, the greater the allowable color boundary variation value.

After the moving object detecting apparatus 10 and/or the moving object detecting method 20 determine whether a moving object appears in the detected area, different functions can be performed according to requirements.

In some embodiments, after the moving object detecting apparatus 10 and/or the moving object detecting method 20 determine a moving object appearing in the detected area, the alarm of the moving object detecting apparatus 10 starts to flash to notify the user. Furthermore, if there is no moving object being detected in the detected area by the moving object detecting apparatus 10 and/or the moving object detecting method 20 for a period of time, the alarm stops flashing accordingly.

In some embodiments, if there is no moving object being detected in the detected area by the moving object detecting apparatus 10 and/or the moving object detecting method 20, a screen saver function is activated, and the display panel 18 of the moving object detecting apparatus 10 displays color blocks different from the original display, reduces the brightness, or turns off to prevent the display panel 18 from burning in and/or save energy. Specifically, in response to no moving object being detected in the detected area, the processor 14 of the moving object detecting apparatus 10 activates a timer to calculate a duration time, and in response to the duration time exceeding a preset warning time, the processor 14 generates a control signal to display color blocks or reduce the brightness of the pixels on the display panel 18.

In some embodiments, after the moving object detecting apparatus 10 and/or the moving object detecting method 20 determines a moving object appearing in the detected area, the processor 14 of the moving object detecting apparatus 10 transmits a warning signal to an external computer via I/O interface 23, and the external computer stores the image containing the moving object, sends messages, makes sound, and/or enables other function for notifying the user or storing the display accordingly.

In summary, the moving object detecting apparatus 10 and the moving object detecting method 20 can detect whether a moving object appears in the detected area without performing calculation according to the pixels of entire picture frame to reduce the consumption of memory and computing resources. Also, since the moving object detecting technology provided by the present disclosure does not need to store the pixels of entire picture frame, the shortcomings of prior art that consume a large amount memory resources.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A moving object detecting apparatus, comprising:

a display panel, configured to display a plurality of pixels; and a processor, electrically connected to the display panel, configured to perform the following operations:

detecting the pixels corresponding to a detected area to generate a first color value and a second color value corresponding to the detected area, wherein the first color value corresponds to a first time point, and the second color value corresponds to a second time point;

comparing the first color value with the second color value to generate a color boundary variation value corresponding to the detected area; and determining whether a moving object appears in the detected area based on the color boundary variation value.

2. The moving object detecting apparatus of claim 1, wherein the first color value comprises a first highest color value and a first lowest color value corresponding to the detected area, and the second color value comprises a second highest color value and a second lowest color value corresponding to the detected area.

3. The moving object detecting apparatus of claim 2, wherein the operation of generating the first color value and the second color value corresponding to the detected area further comprises:

detecting the pixels in the detected area at the first time point to calculate the first highest color value and the first lowest color value of the detected area; and detecting the pixels in the detected area at the second time point to calculate the second highest color value and the second lowest color value of the detected area.

4. The moving object detecting apparatus of claim 2, wherein the operation of generating the color boundary variation value corresponding to the detected area further comprises:

comparing the first highest color value and the second highest color value to calculate a high boundary difference value;

comparing the first lowest color value and the second lowest color value to calculate a low boundary difference value; and calculating the color boundary variation value based on the high boundary difference value and the low boundary difference value.

5. The moving object detecting apparatus of claim 4, wherein the operation of determining whether the moving object appears in the detected area based on the color boundary variation value further comprises:

determining whether the high boundary difference value or the low boundary difference value is larger than a threshold; and in response to the high boundary difference value or the low boundary difference value being larger than the threshold, determining the moving object appearing in the detected area.

6. The moving object detecting apparatus of claim 1, wherein the first color value, the second color value, and the color boundary variation value correspond to a RGB color space.

7. The moving object detecting apparatus of claim 5, wherein the processor is further configured to:

determining the second time point based on the first time point and a detection time interval, wherein a time interval corresponding to the second time point and the first time point is not larger than the detection time interval.

8. The moving object detecting apparatus of claim 7, wherein the processor is further configured to:

determining the threshold based on the time interval corresponding to the second time point and the first time point.

9. The moving object detecting apparatus of claim 1, wherein the processor is further configured to:

in response to the moving object not appearing in the detected area, activating a timer to calculate a duration time; and in response to the duration time exceeding a preset warning time, generating a control signal to reduce a brightness of the pixels on the display panel.

10. The moving object detecting apparatus of claim 1, wherein the processor is further configured to:

receiving a detection signal, wherein the detection signal is configured to indicate at least one detected pixel of the pixels; and determining the detected area based on the at least one detected pixel.

11. A moving object detecting method, being adapted for use in a moving object detecting apparatus, wherein the moving object detecting method comprises the following steps:

detecting, from a plurality of pixels of a display panel, the pixels corresponding to a detected area to generate a first color value and a second color value corresponding to the detected area, wherein the first color value corresponds to a first time point, and the second color value corresponds to a second time point;

comparing the first color value with the second color value to generate a color boundary variation value corresponding to the detected area; and determining whether a moving object appears in the detected area based on the color boundary variation value.

12. The moving object detecting method of claim 11, wherein the first color value comprises a first highest color value and a first lowest color value corresponding to the detected area, and the second color value comprises a second highest color value and a second lowest color value corresponding to the detected area.

13. The moving object detecting method of claim 12, wherein the step of generating the first color value and the second color value corresponding to the detected area further comprises:

detecting the pixels in the detected area at the first time point to calculate the first highest color value and the first lowest color value of the detected area; and detecting the pixels in the detected area at the second time point to calculate the second highest color value and the second lowest color value of the detected area.

14. The moving object detecting method of claim 12, wherein the step of generating the color boundary variation value corresponding to the detected area further comprises:

comparing the first highest color value and the second highest color value to calculate a high boundary difference value;

comparing the first lowest color value and the second lowest color value to calculate a low boundary difference value; and calculating the color boundary variation value based on the high boundary difference value and the low boundary difference value.

15. The moving object detecting method of claim 14, wherein the step of determining whether the moving object appears in the detected area based on the color boundary variation value further comprises:

determining whether the high boundary difference value or the low boundary difference value is larger than a threshold; and in response to the high boundary difference value or the low boundary difference value being larger than the threshold, determining the moving object appearing in the detected area.

16. The moving object detecting method of claim 11, wherein the first color value, the second color value, and the color boundary variation value correspond to a RGB color space.

17. The moving object detecting method of claim 15, further comprising:

determining the second time point based on the first time point and a detection time interval, wherein a time interval corresponding to the second time point and the first time point is not larger than the detection time interval.

18. The moving object detecting method of claim 17, further comprising:

determining the threshold based on the time interval corresponding to the second time point and the first time point.

19. The moving object detecting method of claim 11, further comprising:

in response to the moving object not appearing in the detected area, activating a timer to calculate a duration time; and in response to the duration time exceeding a preset warning time, generating a control signal to reduce a brightness of the pixels on the display panel.

20. The moving object detecting method of claim 11, further comprising:

receiving a detection signal, wherein the detection signal is configured to indicate at least one detected pixel of the pixels; and determining the detected area based on the at least one detected pixel.

* * * * *